(12) United States Patent
Al-Nahhal et al.

(10) Patent No.: US 10,791,564 B2
(45) Date of Patent: Sep. 29, 2020

(54) CHANNEL SELECTION FOR A WIRELESS ACCESS POINT

(71) Applicant: Alcatel Lucent, Nozay (FR)

(72) Inventors: Ibrahim Al-Nahhal, Antwerp (BE); Haris Gacanin, Antwerp (BE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/099,840

(22) PCT Filed: May 22, 2017

(86) PCT No.: PCT/EP2017/062204
§ 371 (c)(1),
(2) Date: Nov. 8, 2018

(87) PCT Pub. No.: WO2017/207308
PCT Pub. Date: Dec. 7, 2017

(65) Prior Publication Data
US 2019/0116604 A1    Apr. 18, 2019

(30) Foreign Application Priority Data

May 31, 2016 (EP) .................................... 16290096

(51) Int. Cl.
*H04W 4/00* (2018.01)
*H04W 72/08* (2009.01)
(Continued)

(52) U.S. Cl.
CPC ........ *H04W 72/085* (2013.01); *H04B 17/318* (2015.01); *H04W 16/18* (2013.01);
(Continued)

(58) Field of Classification Search
USPC ........ 370/241, 252, 328, 329, 331, 332, 341
See application file for complete search history.

(56) References Cited

U.S. PATENT DOCUMENTS

| 8,089,939 B1 * | 1/2012 | Mater | H04W 36/30 |
| | | | 370/332 |
| 2002/0188723 A1 * | 12/2002 | Choi | H04W 36/06 |
| | | | 709/225 |

(Continued)

FOREIGN PATENT DOCUMENTS

| CN | 101849374 A | 9/2010 |
| CN | 103619054 A | 3/2014 |

(Continued)

OTHER PUBLICATIONS

Kannan, G. et al. "An Efficient Feedback Active Noise Control Algorithm Based on Reduced-Order Linear Predictive Modeling of fMRI Acoustic Noise" IEEE Transactions on Biomedical Engineering, Published Dec. 1, 2011.

(Continued)

*Primary Examiner* — Nguyen H Ngo
(74) *Attorney, Agent, or Firm* — Harness, Dickey & Pierce, P.L.C.

(57) ABSTRACT

An access point is configured to derive signal strength levels from channel measurements, predict future signal strength levels based on the signal strength levels; and select a wireless channel based on the predicted future signal strength levels.

9 Claims, 4 Drawing Sheets

(51) Int. Cl.

| | | |
|---|---|---|
| *H04W 36/30* | (2009.01) | |
| *H04W 36/00* | (2009.01) | |
| *H04B 17/318* | (2015.01) | |
| *H04W 16/18* | (2009.01) | |
| *H04W 24/02* | (2009.01) | |
| *H04W 24/10* | (2009.01) | |
| *H04W 84/12* | (2009.01) | |
| *H04W 36/06* | (2009.01) | |

(52) U.S. Cl.
CPC ........... *H04W 24/02* (2013.01); *H04W 24/10* (2013.01); *H04W 36/0094* (2013.01); *H04W 36/30* (2013.01); *H04W 36/06* (2013.01); *H04W 84/12* (2013.01)

(56) References Cited

U.S. PATENT DOCUMENTS

| | | | |
|---|---|---|---|
| 2004/0037247 A1* | 2/2004 | Ngo | H04W 72/08 370/332 |
| 2006/0109799 A1* | 5/2006 | Tseng | H04L 45/02 370/254 |
| 2008/0019324 A1 | 1/2008 | Matsumoto et al. | |
| 2009/0117851 A1* | 5/2009 | Malaney | H04W 16/18 455/67.11 |
| 2010/0130206 A1* | 5/2010 | Chin | H04W 36/30 455/436 |
| 2010/0304738 A1* | 12/2010 | Lim | H04W 36/30 455/426.1 |
| 2011/0044177 A1 | 2/2011 | Nair et al. | |
| 2015/0304929 A1* | 10/2015 | Hua | H04W 36/32 455/436 |
| 2016/0044444 A1* | 2/2016 | Rattner | H04W 4/80 455/41.2 |
| 2016/0095009 A1* | 3/2016 | Ling | H04W 16/14 370/329 |
| 2016/0165555 A1* | 6/2016 | Jeong | H04W 52/243 455/447 |
| 2017/0026293 A1* | 1/2017 | Desclos | H04W 36/22 |
| 2017/0223572 A1* | 8/2017 | Lee | H04W 28/08 |

FOREIGN PATENT DOCUMENTS

| | | |
|---|---|---|
| EP | 2046082 A1 | 4/2009 |
| JP | 2003-153337 A | 5/2003 |
| JP | 2008-306277 A | 12/2008 |
| JP | 2009-213093 A | 9/2009 |
| JP | 2016-058907 A | 4/2016 |

OTHER PUBLICATIONS

International Search Report of PCT/EP2017/062204 dated Jun. 26, 2017.
Office Action dated Feb. 25, 2020 in Japanese Application No. 2018-562643.
Office Action dated Jul. 1, 2020, issued in corresponding Chinese Patent Application No. 201780033044.6.

* cited by examiner

CHANNEL SELECTION FOR A WIRELESS ACCESS POINT

CROSS-REFERENCE TO RELATED APPLICATIONS

This application is a national phase under 35 U.S.C. § 371 of PCT International Application No. PCT/EP2017/062204, filed May 22, 2017, which claims priority to European Application No. 16290096.3 filed May 31, 2016, the entire contents of each of which are hereby incorporated by reference.

FIELD OF THE INVENTION

The present invention relates to the field of channel selection of a wireless access point.

BACKGROUND OF THE INVENTION

A wireless access point, AP, operating according to the IEEE 802.11 Wi-Fi standard may exhibit performance loss caused by interference. Interference can originate from other APs or wireless devices in general that operate in the same or neighbouring frequency bands. The performance loss typically results in a loss of bandwidth and higher power consumption.

A Wi-Fi AP can operate within a selection of channels each characterized by a certain frequency band. In order to optimize its throughput, an AP may select a channel in which it exhibits the least interference.

SUMMARY OF THE INVENTION

A way to select the most optimal channel is through a selection process that scans the environment of the AP. This selection process is based on a single measurement in time from which information about the optimal channel is derived. This information relates to the available bandwidth in the channels. Hence, through the measurement the availability of bandwidth in each channel at the measuring time is known. Consequently, it can be decided which channel has the most effective performance. This channel will then be selected.

It is however a drawback that the decision is based on a measurement taken at one certain moment in time, the measuring time, because it does not take into account the dynamically changing environment.

It is therefore an objective of the present invention to alleviate the above drawback and to provide an improved solution for selecting a wireless channel of an AP.

This object is achieved, in a first aspect, by an apparatus for selection of a wireless channel of a wireless access point, the apparatus comprising a calculation module configured to receive channel measurements and to derive therefrom signal strength levels of channels of the AP; and a signal strength prediction module configured to predict future signal strength levels.

The calculation module is configured to receive channel measurements. This implies the module scans the environment of the AP and information related to the channels is obtained. Since it will derive from the measurements signal strength levels of channels of the AP, data is collected related to the available bandwidth in each channel. Next, based on the signal strength levels, a signal strength prediction module will predict future signal strength levels of each channel of the AP. These future signal strength levels are again related to the available bandwidth in each channel. Hence, a channel can be selected based on the measurements and the made predictions proceeding from these measurements.

It is an advantage that the selection process of a channel of an AP is not only based on the measurements taken at one certain moment in time but is combined with predicted signal strength levels proceeding from these measurements. This responds to the dynamically changing environment and as a result a channel with potentially optimal bandwidth is selected. Furthermore, it is also an advantage that this results in less power consumption of the AP.

According to an embodiment, the channel measurements are received signal strength indication, RSSI, levels.

The RSSI levels are included in the IEEE 802.11 Wi-Fi standard and measured in dBm. Therefore they indicate the strength of the signal for each channel of the AP.

It is an advantage that the channel measurements are RSSI levels because they immediately indicate the signal strength level. Consequently, a standard value can be used and no computation from a measurement to a signal strength level is needed According to an embodiment, the calculation module is further configured to receive the channel measurements from the AP and/or one or more devices connected to the AP.

The calculation module receives a multitude of measurements by different devices. These measurements can be either directly RSSI levels or can be converted into signal strength levels. These different signal strength levels, immediately received or derived from the measurements of the different devices can then be used to predict future signal strength levels.

It is an advantage that the predicted future signal strength levels of the channels will be more precise since not only a measurement from one device is used but different measurements received from a multitude of devices.

According to an embodiment, the calculation module is further configured to average for each channel the signal strength levels derived from the channel measurements received from the AP and/or one or more devices connected to the AP.

Since the signal strength levels per channel are averaged, the signal strength prediction module can predict the future signal strength levels for each channel by the use of one value per channel It is an advantage that the signal strength prediction module can operate with one value of a signal strength level per channel in order to predict future signal strength levels, since the prediction can be performed faster due to the necessity of less computation time.

According to an embodiment, the signal strength prediction unit is configured to predict a future signal strength level for each channel using linear prediction coding.

Since the signal strength prediction unit is configured to predict a future signal strength level for each channel using linear prediction coding, the predicted values are not only based on one measurements but on a number of previous measured values.

Since previous measured values are illustrative to the changing environment, and because they are used to predict future signal strength levels, the predicted values anticipate to this changing environment. This way, it is an advantage that the predicted values will be more precise.

According to an embodiment, the signal strength prediction module is further configured to predict a future signal strength level for each consecutive future time period, the sample time period, within a forthcoming time period, the channel period.

In other words, the signal strength prediction module can not only predict one future signal strength level per channel but can predict a number of future signal strength levels for the forthcoming channel period.

It is an advantage that a number of future signal strength levels per channels are predicted for the forthcoming channel period since not only the changing of the environment for a sample period is taken into account but for that of a whole channel period.

According to an embodiment, the signal strength prediction module is further configured to average the predicted future signal strength levels for the forthcoming channel period per channel, thereby obtaining an average future level.

In this way, one future signal strength level per channel is calculated by averaging the predicted signal strength values of each sample period for the forthcoming channel period.

By averaging the predictions over the whole channel period, it is an advantage that the changing of the environment over the whole channel period is taken into account. The outcome is one predicted future signal strength level per channel.

According to an embodiment, the channel selector is further configured to select a channel with the highest value of the average future level.

Thus, per channel one value is computed by the signal strength prediction unit, in particular an average future signal strength level. Each channel period the channel selector will compare the current channel with the channel that has the highest predicted signal strength level. If the current channel is different than the channel with the highest predicted signal strength level, the channel selector will select the latter one.

Since the channel with the highest predicted signal strength level is selected it is an advantage that the availability of bandwidth will increase for the forthcoming channel period and consequently less power will be consumed during the operation of the AP.

According to a second aspect the disclosure relates to a method for selecting a wireless channel of an AP, the method comprising receiving channel measurements and deriving therefrom signal strength levels of the AP; and predicting future signal strength levels of the channels based on the signal strength levels; and selecting the wireless channel based on the predicted future signal strength levels.

According to a third aspect, the disclosure relates to a computer program product comprising computer-executable instructions for performing the method according to the second aspect when the program is run on a computer.

According to a fourth aspect, the disclosure relates to a computer readable storage medium comprising the computer program product according to the third aspect.

According to a fifth aspect, the disclosure relates to a data processing system programmed for carrying out the method according to the second aspect.

DETAILED DESCRIPTION OF EMBODIMENT(S)

Figure 1:
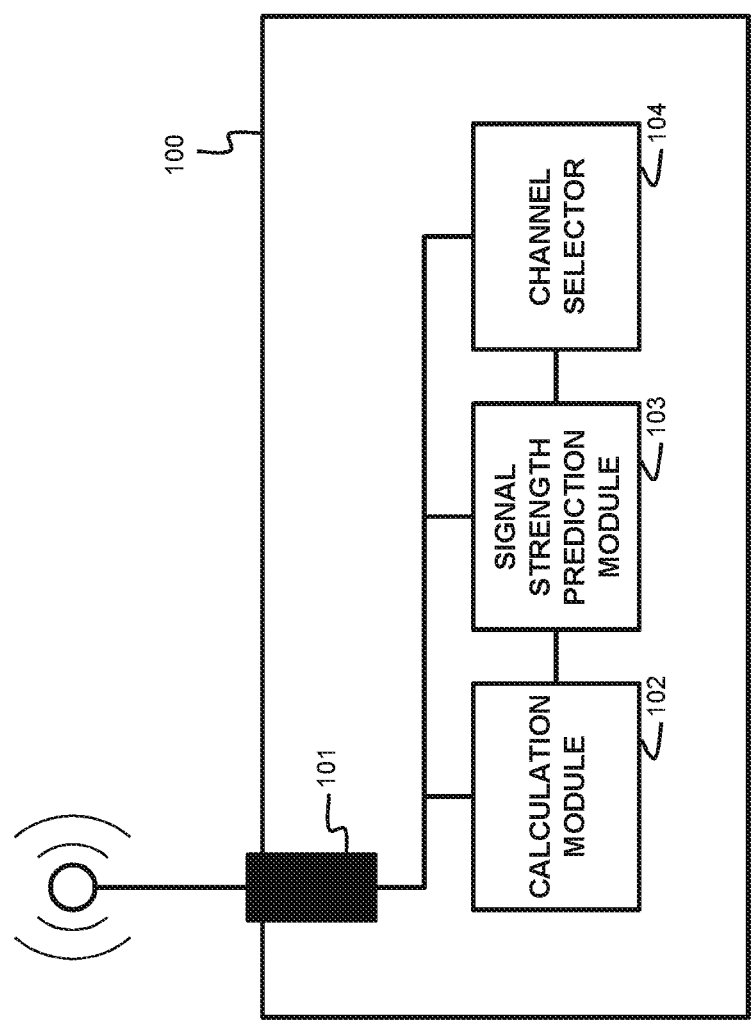
FIG. 1 illustrates an apparatus for channel selection of a wireless access point according to an embodiment of the invention.

According to an embodiment, the invention relates to an apparatus for selection of a wireless channel of a wireless access point (AP), which can be used for example for a Wireless Local Area Network (WLAN). FIG. 1 illustrates such an apparatus 100, comprising a calculation module 102, a signal strength prediction module 103 and a channel selector 104. The apparatus 100 also comprises a network interface 101. Via this network interface 101, the calculation module 102 is configured to receive channel measurements. By these channel measurements, the calculation module 102 will derive signal strength levels of channels of the AP. According to an embodiment of the invention, the measurements can also be directly received signal strength indication, RSSI, levels. Subsequently, the signal strength prediction module 103 is configured to predict future signal strength levels within channels of the AP. These predicted future signal strength levels are based on the signal strength levels derived or directly received as RSSI levels by the calculation module 102. Next, the channel selector 104 of the apparatus 100 will select a channel for the AP based on the future signal strength levels predicted by the signal strength prediction module 103.

Figure 2:
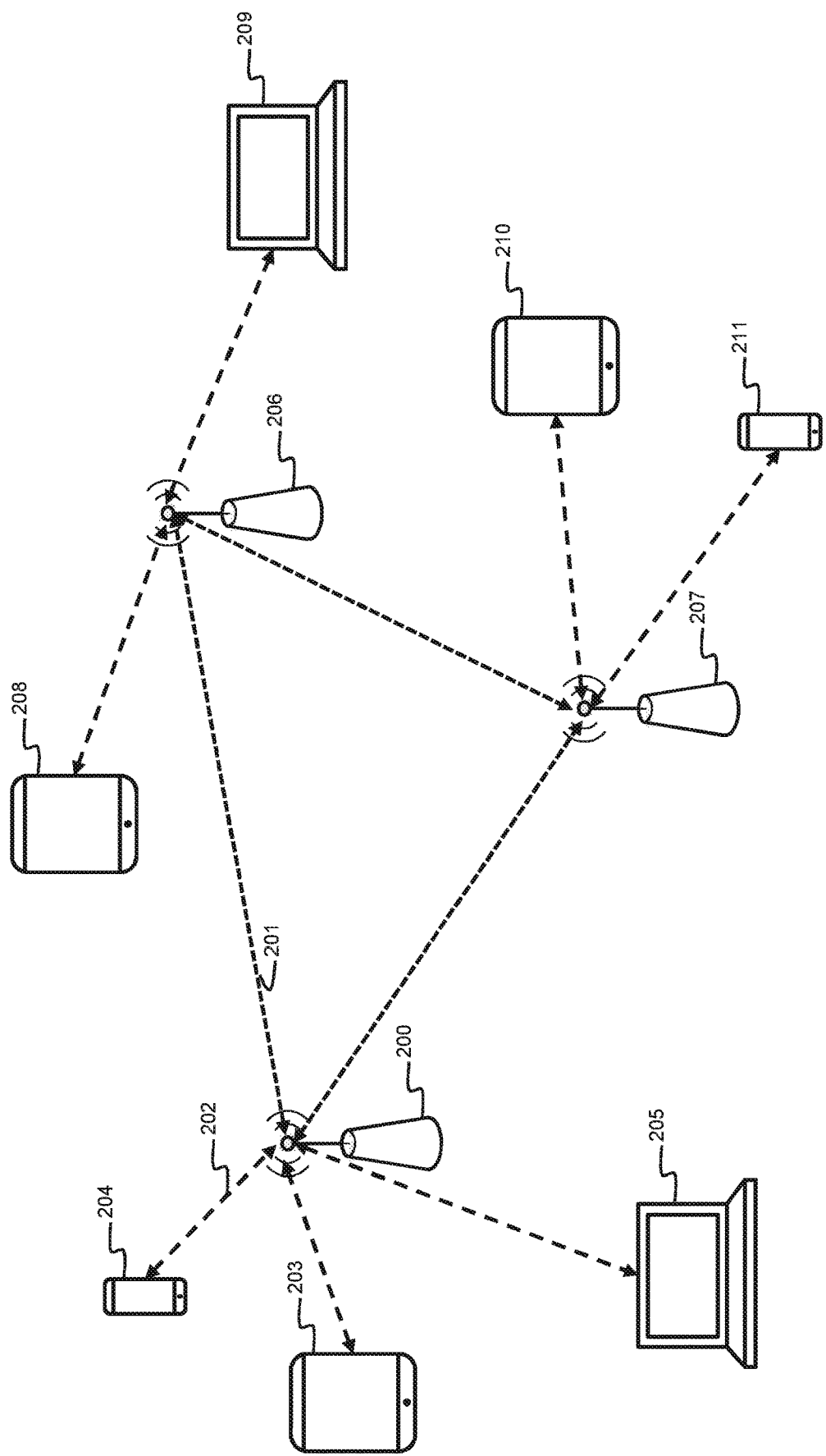
FIG. 2 illustrates a system wherein a plurality of devices are connected to a wireless access point while the access point is operating in the proximity of other wireless access points according to an embodiment of the invention.

Wireless access points are commonly working as a system together with other devices which are operating in the same or neighbouring frequency bands. FIG. 2 is an illustration of such a system comprising an AP according to an embodiment of the invention. Different APs are presented, such as AP 200. Diverse devices can be connected 202 to AP 200, such as a smartphone 204, a tablet 203 or a laptop 205. Since other APs like 206, with connected devices 208 and 209, and AP 207, with connected devices 210 and 211, may operate in the same channel of AP 200, they may interfere 201 with AP 200. Inference means one or more APs are operating in the same of neighbouring frequency bands as that one of the AP 200. Due to this interference, a decreased performance of the AP 200 can occur resulting in for example a loss of bandwidth and/or higher power consumption. Hence the apparatus 100 will select 104 a channel for the AP 200 in order to optimize its performance, i.e. a channel with a potentially optimal bandwidth is selected.

Figure 3:
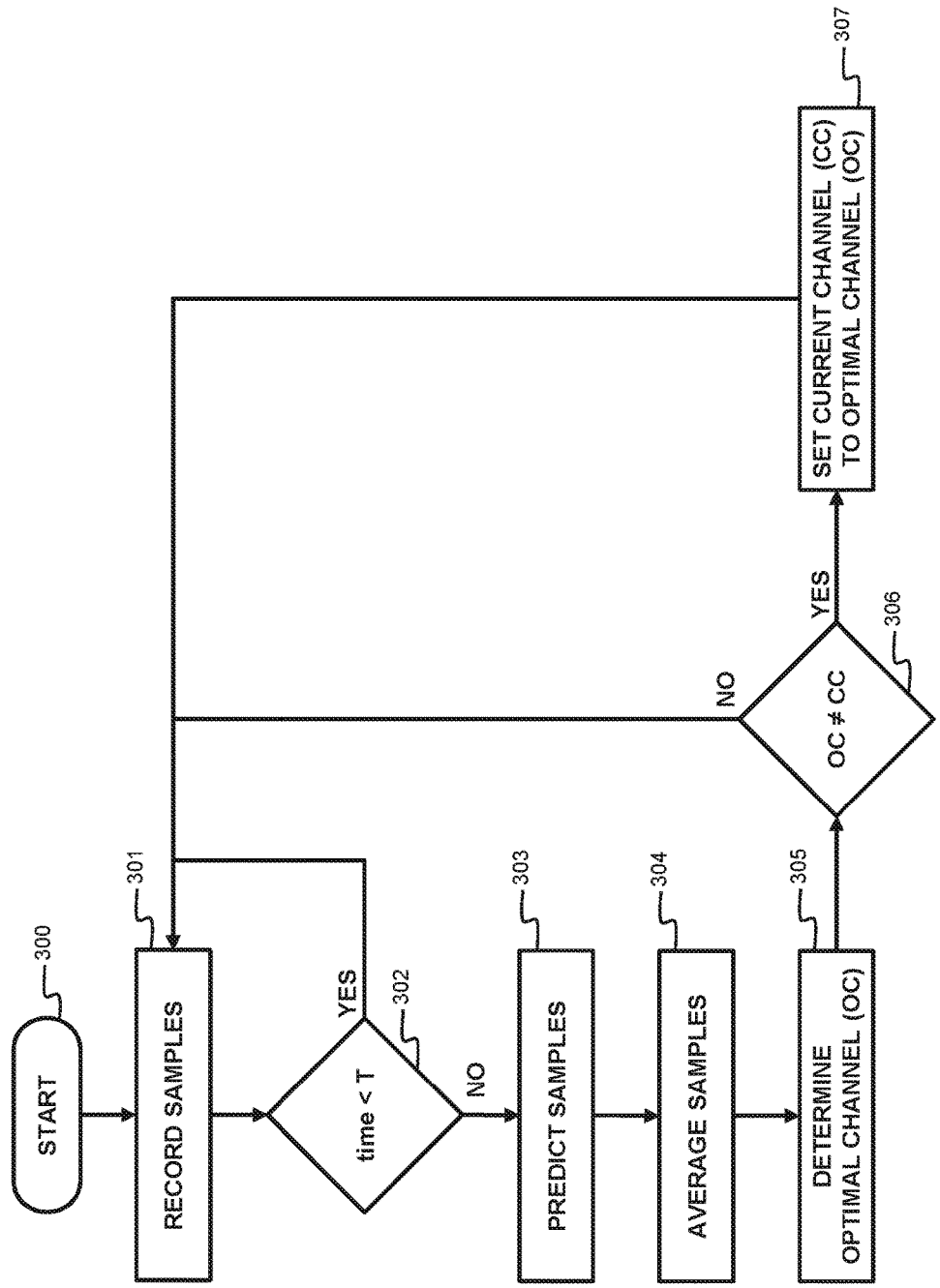
FIG. 3 illustrates steps performed by an apparatus for channel selection of a wireless access point according to an embodiment of the invention.

FIG. 3 illustrates steps performed by the apparatus 100 in order to select a channel of, for example, the AP 200 with potentially optimal bandwidth according to an embodiment of the invention. At the start 300 the apparatus will record 301 samples. These samples are channel measurements received 101 by the calculation module 102. These measurements can be received from the AP 200 itself, but also from devices connected 202 to the AP 200, such as a smartphone 204, a tablet 203 or a laptop 205. The calculation module 102 will collect and schedule the channel measurements received from the AP 200 and devices 203, 204 and 205. The channel measurements can for example be received signal strength indications (RSSI) levels. Per channel these RSSI levels are then averaged resulting a signal strength level per channel of the AP. This step will be repeated each unit time period, the sample time period.

After a predetermined unit time period T, referred as the channel period, the signal strength prediction module 103 will start to 302 predict 303 samples by use of the recorded 301 samples. These predicted samples 303 are thus estimated future signal strength levels and are predicted for each channel of the AP. Thus, a prediction is made for each channel and for each consecutive future sample period during the forthcoming channel period T. As a result, a number of predicted samples are computed per channel which correspond to future signal strength levels. This operation is executed in step 303.

In order to predict future signal strength levels, the signal strength prediction module 103 can be, for example, configured to use linear prediction coding (LPC). The principle of LPC is as follow. The predicted sample at a time n is presented as x̂(n), while the previous recorded samples are presented as x(n−i). In order to predict x̂(n), predictor coefficients are needed and presented as $a_i$. Hence, the LPC filter can predict the future sample by the following equation:

$$\hat{x}(n) = \sum_{i=1}^{P} a_i x(n-i) \quad \text{(Eq. 1)}$$

wherein P is the order of the LPC filter and n is a discreet time moment. The predictor coefficients $a_i$ can be determined using n−1 recorded samples by solving the following equation:

$$\begin{bmatrix} r(0) & r(1) & \cdots & r(P-1) \\ r(1) & r(0) & \cdots & r(P-2) \\ \vdots & \vdots & \ddots & \vdots \\ r(P-1) & r(P-2) & & r(0) \end{bmatrix} \begin{bmatrix} a_1 \\ a_2 \\ \vdots \\ a_P \end{bmatrix} = \begin{bmatrix} r(1) \\ r(2) \\ \vdots \\ r(P) \end{bmatrix} \quad \text{(Eq. 2)}$$

wherein r(i) represents an autocorrelation coefficient and can be calculated by shifting samples by i steps as follows:

$$r(i) = \sum_{k=0}^{n-i-1} x(k)x(k+i) \quad \text{(Eq. 3)}$$

wherein k is the number of the sample. Accordingly by combining Eq. 1, 2 and 3, a sample can be predicted for the first future sample period.

Subsequently, the predicted future sample for the first future sample period is considered as a recorded sample for calculating a future sample for the second future sample period. Thus, by again combining Eq. 1, 2 and 3, by shifting the time moment and by considering the previous predicted sample as a recorded sample, a sample for the second future sample period can be predicted. This procedure will be repeated in order to predict samples for the whole forthcoming channel period T. As a result m predicted samples per channel for the forthcoming channel period are computed, wherein m equals to the ratio of the channel period T over the sample period.

The m predicted future samples per channel for the forthcoming channel period are then averaged by the signal strength prediction module 103, thereby obtaining an average future level $I_c$ per channel. This step is performed in 304 wherein the following equation is used $$I_c = \frac{\sum_{i=0}^{m-1} \hat{x}(n+i)}{m}. \quad \text{(Eq. 4)}$$

In the next step 305 the optimal channel (OC) is determined by identifying the channel which has the highest value of the calculated average future signal strength level. This channel is the OC for the forthcoming channel period.

The current channel (CC) is compared with the just determined OC. This is done in step 306. If the CC is different from the OC the channel will be changed to the OC 307. Afterwards, the procedure is repeated. If the CC is the same as the OC the channel will not be changed, and again the procedure is repeated.

Figure 4:
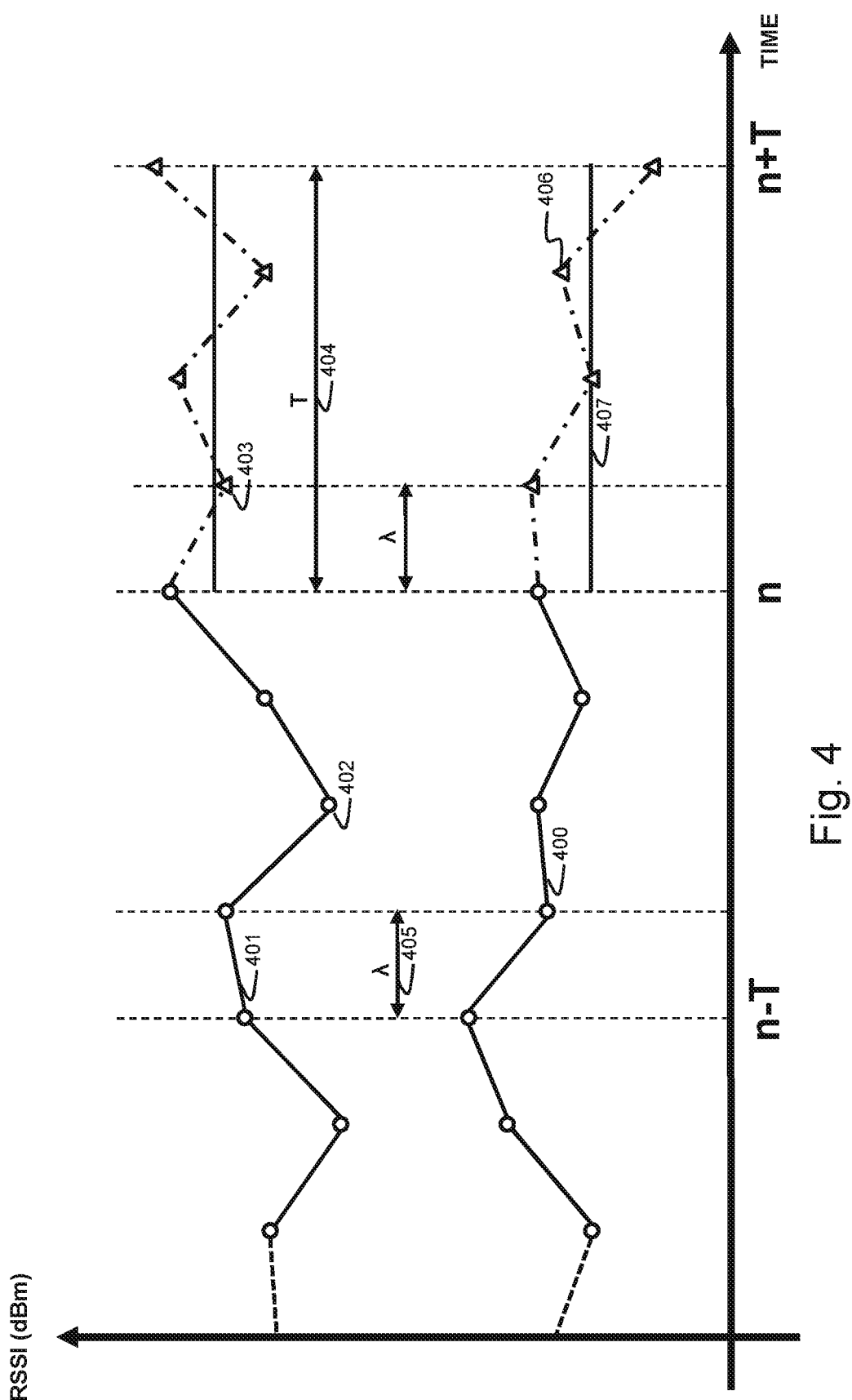
FIG. 4 shows an illustrative example of signal strength levels and predicted future signal strength levels of two channels of a wireless access point according to an embodiment of the invention.

FIG. 4 shows a graph with measured signal strength levels and predicted signal strength levels as a function of time of two channels 400 and 401 according to an embodiment of the present disclosure. At a certain moment in time n for each channel 400 and 401 a number of RSSI levels have been previously measured and are expressed in dBm. For example for channel 401 a measured RSSI level is presented as 402. These RSSI levels have been measured each sample time period and the sample time period is presented as λ 405.

The channel period T 404, according to an embodiment of the invention, can for example be 15 minutes while the sample time period can be 3 minutes. This results in 5 predicted future signal strength levels per channel each channel period T.

The order P of the LPC filter, according to an embodiment of the invention, can for example be equal to 3.

An optimum number of samples used to predict the future signal strength levels, according to embodiment of the invention, is in the range between 30 and 50.

At time n, which corresponds to the end of a previous channel period and the start of a forthcoming channel period, presented as 404, the signal strength prediction module 103 will predict 303 future signal strength levels for the forthcoming channel period T 404. An example of a predicted future signal strength level is presented as 403 for channel 401 and as 406 for channel 400.

A future signal strength level is predicted for each sample time period λ 405 for a forthcoming channel period T. These predictions are made at time n. For each channel 400 and 401 the predicted future signal strength levels are then averaged, presented as, for example, 407 for channel 400.

Thus, at time n an average predicted future signal strength level is calculated. Next, at the same moment in time n the channel selector will select the channel with the highest value of the predicted future signal strength levels. This channel will be used by the AP for the forthcoming channel period T 404.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An apparatus for selection of a wireless channel of a wireless access point (AP) in a Wi-Fi network, the apparatus comprising:
   a memory storing computer readable instructions; and
   a processor operatively connected to the memory, the computer readable instructions providing instructions to cause the processor to,
      receive, from the AP and one or more user devices connected to the AP, channel measurements for channels of the AP during a first channel period;
      derive signal strength levels for the channels of the AP from the channel measurements;
      determine predicted future signal strength levels of the channels, for a forthcoming channel period following the first channel period, based on the signal strength levels; and
      select a channel of the channels based on the predicted future signal strength levels, the processor being configured to select the channel with a highest value of the predicted future signal strength levels.

2. The apparatus of claim 1, wherein the channel measurements are received signal strength indications (RSSI) levels.

3. The apparatus of claim 1, wherein the processor is further configured to average for each channel of the channels the signal strength levels derived from the channel measurements.

4. The apparatus of claim 1, wherein the processor is further configured to predict a future signal strength level for each channel of the channels by linear prediction coding.

5. The apparatus of claim 4, wherein the processor is further configured to predict a future signal strength level for each channel of the channels and for each consecutive future time period.

6. The apparatus of claim 5, wherein the processor is further configured to average the predicted future signal strength levels for each channel of the channels to obtain an average future level.

7. The apparatus of claim 1, wherein a number of samples used to predict the future signal strength levels is in a range between 30 and 50.

8. A method for selecting a wireless channel of a wireless access point (AP), the method comprising:
   receiving, at a processor of an apparatus, from an AP and one or more user devices connected to the AP, channel measurements for channels of the AP during a first channel period;
   deriving, by the processor, signal strength levels for the channels of the AP from the channel measurements;
   determining, by the processor, predicted future signal strength levels of the channels for a forthcoming channel period following the first channel period, based on the signal strength levels; and
   selecting, by the processor, a channel based on the predicted future signal strength levels, the processor selecting the channel that has a highest value of the predicted future signal strength levels.

9. A non-transitory computer readable storage medium storing computer-executable instructions, which when executed by the processor of the apparatus, cause the apparatus to perform the method of claim 8.

* * * * *